M. K. DUNHAM.
APPARATUS AND METHOD OF BURNING COMBUSTIBLE GASES.
APPLICATION FILED APR. 10, 1918.
1,301,044. Patented Apr. 15, 1919.
2 SHEETS—SHEET 1.
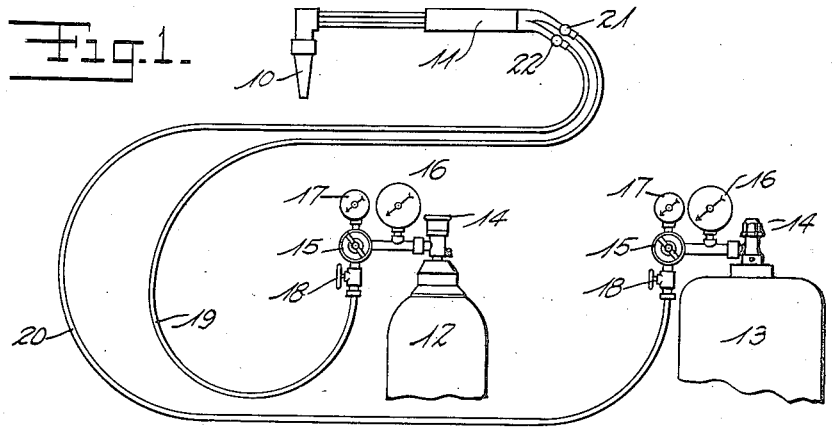
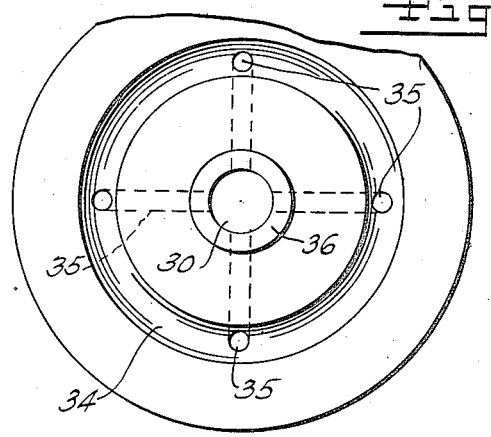
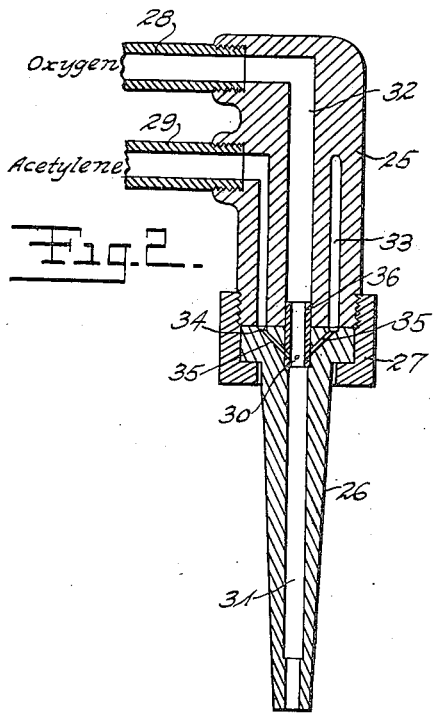
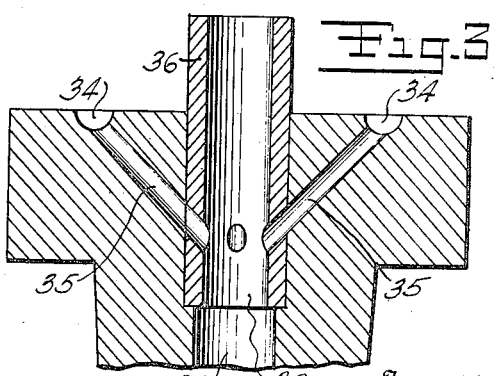
Inventor
Melbourne Keith Dunham
By his Attorney M. K. DUNHAM.
APPARATUS AND METHOD OF BURNING COMBUSTIBLE GASES.
APPLICATION FILED APR. 10, 1918.
1,301,044.
Patented Apr. 15, 1919.
2 SHEETS—SHEET 2.
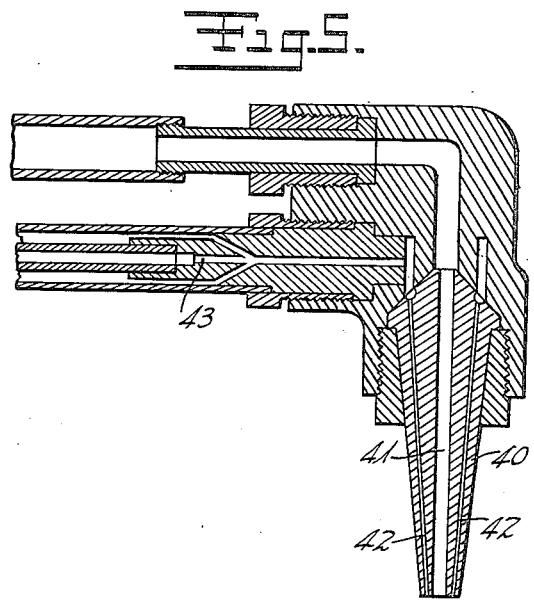
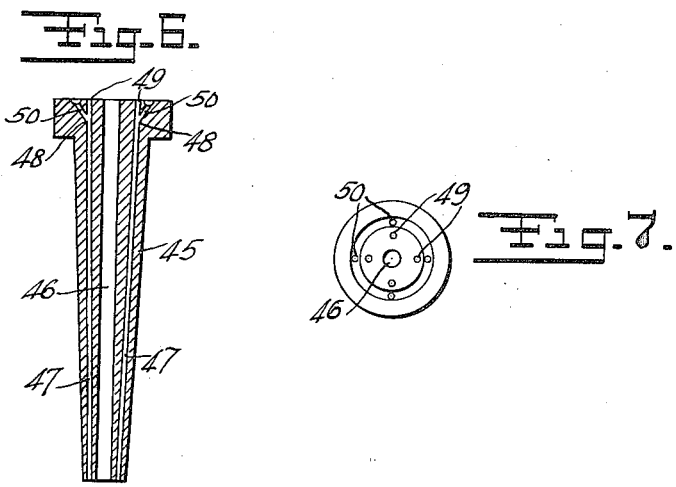

UNITED STATES PATENT OFFICE.

MELBOURNE KEITH DUNHAM, OF JERSEY CITY, NEW JERSEY.

APPARATUS AND METHOD OF BURNING COMBUSTIBLE GASES.

1,301,044.  Specification of Letters Patent.  Patented Apr. 15, 1919.

Application filed April 10, 1918. Serial No. 227,646.

*To all whom it may concern:*

Be it known that I, MELBOURNE KEITH DUNHAM, a citizen of the United States, and resident of Jersey City, in the county of Hudson and State of New Jersey, have invented certain new and useful Improvements in Apparatus and Methods of Burning Combustible Gases, of which the following is a specification.

This invention is primarily for use in connection with or incorporation in blow-pipes, welding torches, lead burning torches and other similar instruments which burn a mixture of oxygen and acetylene or other combustible gas, the main objects of the invention being to prevent the occurence of "flashbacks", reduce the consumption of oxygen and attain the theoretical mixture of one volume of acetylene to one of oxygen.

In the ordinary welding torch or cutting torch which uses oxygen and acetylene, the separate gases are delivered to a mixing chamber from which the mixed gases flow to the tip, and are ignited. A tool of this type, as hitherto constructed, is subject to the phenomenon known as a "flash-back". By this term is meant the ignition or burning of the gas mixture in the mixing chamber, the gas passages, or in the hose or regulators instead of at the end of the tip. A flashback is undesirable for many reasons. When it occurs, it is necessary to shut off one or both of the gases so as to put out the flame which is burning within the passage and then turn them on, relight and readjust the flame. This puts the welding torch or cutting torch out of use for an interval of time. In addition, the burning of the gases in the interior of the torch and the consequent heat of this combustion is likely to and often does injure or destroy the tool. Under some conditions it may also be hazardous, as will readily be seen.

In making a weld, it is of the utmost importance that the flame shall be played steadily upon the metal and the omission of the flame for the time necessary to extinguish the flashback and readjust the flame is often exteremely vital to the making of a perfect weld. The heat conduction qualities of the metal, while the flame is withheld, results in a loss in efficiency, since the welded area cools during the time the torch is withheld. In addition, the imperfect combustion of the gases within the interior of the torch will cause a carbonaceous deposit upon the metal and if this metal is wrought iron or steel, at that point the weld will be deficient in strength, due to a large increase in the carbon content, as iron or steel at a red or white heat absorbs carbon rapidly.

In a cutting torch, a flashback is annoying and particularly costly, as half inch metal with a properly working torch may be cut at the rate of two feet per minute. To shut off the gases, re-light, and adjust the flame, takes considerable time and the speed of cutting is materially reduced when a torch flashes. The heat of combustion in the interior of the torch is also likely to destroy the tool and at least in practically all cases does roughen up the interior of the walls through which the gases pass, thereby producing easier conditions for constant flashbacks.

To produce a so-called neutral welding flame, one neither carbonizing or oxidizing, requires one volume of oxygen for one volume of acetylene. It requires two and one-half volumes of oxygen to completely consume one volume of acetylene, one and one-half volumes of oxygen being taken from the atmosphere and the other one volume from the oxygen supply in the cylinder, gas-holder or manifold; this is the theory. In practice heretofore, more oxygen usually has been necessary than the one volume, due to conditions heretofore not surmounted.

The acetylene supply may be either in a so-called medium pressure generator delivering the acetylene at a pressure not greater than fifteen pounds, or in the safety storage cylinder containing acetylene under a pressure up to two hundred and fifty pounds. Insurance regulations practically prohibit the generation of or use of acetylene under a pressure greater than fifteen pounds, so that welding and cutting torches, to be safe and economical, should not use an acetylene pressure greater than fifteen pounds to secure the proper flame sizes. If a medium pressure generator is employed for the acetylene supply, it will not with safety operate beyond this pressure and if safety storage acetylene is used, there is a considerable wastage if the acetylene pressures of the torch are greater than fifteen pounds, as the gas remaining in the cylinder under a pressure of that required by the torch cannot be used.

As it is the acetylene which produces the heat and the oxygen is simply the supporter of combustion, it can be deduced that the torch which uses the least amount of oxygen from the supply line is the most economical. Any excess over the theoretical amount of oxygen which is used represents that much money thrown away.

I have discovered that the flashback is caused by lack of speed of the mixed gases at the point where they co-mingle, their flow being less than the speed of flame propagation of the mixture at that point. This rate of flame propagation in some mixtures may reach 330 feet per second. With this condition present, a flashback may be caused by any one of the various conditions, such for instance, as overheating the mixing chamber, causing the mixed gases to ignite at that point; rough spots or obstructions in the tips, thereby reducing the velocity of the gases below that of flame propagation; or bringing the flame in too close contact with the metal to be heated or cut, thereby forcing the flame into the interior of the torch.

Even if a flashback occurs, I have discovered that if the speed of the mixture at the point where the gases co-mingle is greater than that of the speed of flame propagation, the velocity of the mixture will instantly carry the flame to the tip even if it should temporarily travel inwardly from the tip toward or even to a point of co-mingling.

It is a well known fact that any combustible gas will not burn without a proper air or oxygen mixture and I have discovered that the speed of the flame propagation of oxyacetylene mixtures increases as oxygen is added to the mixture and decreases as oxygen is taken away from the mixture. A neutral flame will flashback with much less speed than will an oxidizing one and a sufficiently carbonizing flame will not burn against the flow at all.

In all torches heretofore constructed of which I have knowledge, the oxygen is delivered into the mixing chamber at as great or a greater pressure than is the acetylene. In torches termed "injector type" the oxygen is under a comparatively high pressure and the acetylene is practically stationary and the velocity of the oxygen is the agent used to aspirate a sufficient quantity of acetylene to produce a neutral flame. In torches termed "medium pressure type" the acetylene is under some pressure, sometimes as high as ten pounds, and the oxygen is under a still greater pressure and this pressure is used to partially aspirate the acetylene. In torches termed "equal pressure type" the two gases co-mingle at about even pressures but sometimes with the oxygen slightly in excess. In the injector type and medium pressure type, the oxygen is considerably in excess in pressure of the acetylene as it enters the mixing chamber or the point where the gases co-mingle. It follows then that at and from this point the oxygen continues to be in excess until the aspiration action of the pressure of the oxygen causes a sufficient amount of acetylene to flow at a speed equal to that of the oxygen. At the point where the gases co-mingle, the character of the mixture must be and always is of an oxidizing nature and likewise at this point the flow or speed of some portion of the mixed gases is below that of the speed of flame propagation. Overheating of the mixing chamber at this point will cause a flashback for the reason that the mixed gases are not traveling at a speed greater than the speed of flame propagation of the mixture at that point.

Flying particles of metal partially obstructing the tip or the act of bringing the tip close to or in contact with the metal will cause the higher pressure of the oxygen to back up the acetylene, the character of the mixture at the tip immediately becomes oxidizing and as an oxidizing mixture burns against the flow at a rapid speed, the flame returns to the interior of the torch to that point where the acetylene has been backed up and where it has a sufficient volume of oxygen to burn it.

In these two types, the injector and the medium pressure, the oxygen is always in excess at the point where the acetylene starts to co-mingle with it and therefore the condition is always present for a flashback,—a speed of the mixture below that of the speed of flame propagation.

In the equal pressure type, as the two gases enter the mixing chamber at equal pressures, there must be a momentary stopping of each as they start to co-mingle if the point where they co-mingle is restricted enough in area to produce the necessary velocity and in this event, the overheating of the tip or other conditions previously described would create a flashback at that point. If the gases are perfectly balanced in pressure, the heavier gas will naturally predominate in volume and this gas being the oxygen, the character of the mixture is oxidizing and there is a condition present where a flashback is imminent.

In carrying out my invention, I impart to the acetylene a sufficient speed as it enters the mixing chamber and co-mingles with the oxygen so that at this point, with a neutral flame burning at the tip, the speed of both gases is greater than that of the speed of flame propagation of the mixture at the point where the gases co-mingle. The acetylene must be under a greater pressure than that of the oxygen to obtain this result. The heating of the chamber at this point to a sufficient degree to ignite the mixed gases will not cause a flashback, as the speed of the mixture will carry the flame to the tip. If obstructions, such as flying particles of molten metal or bringing the tip close to or upon the metal reduces the velocity of the mixture at the tip and tends to drive the flame into the interior of the torch, the acetylene, being under the greater pressure, immediately seals the oxygen, causing a carbonizing mixture to flow from the mixing chamber to the tip and ignite and as this carbonizing flame cannot flashback, the acetylene alone or with some quantity of oxygen, depending upon the size of the obstruction, continues to burn at the tip, until the obstruction is removed, when the oxygen again flows through in full volume, producing a neutral flame.

My invention is capable of being applied mechanically in various ways, but it is necessary to have two conditions present at all times. First, the acetylene must be under a greater pressure than that of the oxygen as the two gases co-mingle and second, the mixing chamber or point where they co-mingle must be of such dimension or area that the mixed gases do not fall below the speed of the flame propagation of the mixture. The rate of flow of the mixture at the outlet from the tip must of course be greater than the rate of flame propagation as is true with all oxy-acetylene burners.

Inasmuch as it is preferable to limit the acetylene to a pressure not exceeding fifteen pounds on the largest flame sizes (though my invention is not limited to that pressure) it is desirable to secure an oxygen pressure approaching that of the acetylene but not of course equaling it, so that the proper speed of the mixture may be obtained and at the same time the gases do not issue from the tip at such velocity as to interfere with the proper and intelligent operation of the torch. Also, the acetylene must flow up as fast as it flows down.

The mixing chamber may be within the tip itself, it may be in the head or between the tip and the handle, within the handle, or at the end of the handle. I prefer the mixing chamber within the tip itself in order to change the mixing chamber each time the flame size is changed and thus secure the right character of flame mechanically, though it may be understood that if the mixing chamber is back of the tip, my invention may be applied as well.

As my invention resides primarily in the relative pressures of the gases and the relative sizes of the passages and parts, it will be evident that my invention may be utilized or incorporated in a wide variety of different forms only a few of which are illustrated in the accompanying drawing to which reference is to be had.

In these drawings:

Figure 1 is a somewhat diagrammatic view of a oxy-acetylene burning apparatus.

Fig. 2 is a central longitudinal section through one form of tip embodying my invention and in which my improved method may be carried out.

Fig. 3 is a section of the tip as shown in Fig. 2 but on an enlarged scale.

Fig. 4 is a plan view of the end of the tip shown in Fig. 3.

Fig. 5 is a section somewhat similar to Fig. 2 but showing a cutting torch with the mixing chamber in advance of the tip.

Fig. 6 is a longitudinal section through the tip of a cutting torch having a plurality of mixing chambers therein.

Fig. 7 is an end view of the tip shown in Fig. 6.

In the ordinary oxy-acetylene burning apparatus there is provided a tip 10, secured to a handle 11 which latter has a plurality of passages therethrough for the separate gases. The oxygen and the acetylene may be delivered from appropriate sources of supply which I have illustrated diagrammatically in Fig. 1 as tanks 12 and 13, but my invention is applicable for use in the burning of gases delivered from any other sources, such for instance as gas generators if the gases be under sufficient pressure. Each tank has its shut-off valve 14 and pressure regulator 15, and each preferably has two pressure gages 16 and 17, one for indicating the tank pressure and the other for the pipe line pressure behind the regulator. At the outlet from each pressure regulator is a manually operable valve 18 for turning on or off the supply to the corresponding pipe lines 19 and 20. There are also needle valves 21 and 22 at the connections between the pipe lines and the tool.

The apparatus above referred to may be of any common type and none of the details or specific parts so far as shown in Fig. 1 constitute any portion of my invention. They are illustrated merely as a typical apparatus in which my improved method may be carried out.

In Fig. 2 I have shown on a somewhat enlarged scale a part of a blow pipe or welding torch embodying my invention and adapted for use in carrying out my improved process. The construction illustrated, in common with many constructions now in use, has a torch head 25, a tip 26 detachably secured thereto by a coupling or collar 27 and a pair of gas supply pipes 28 and 29, the former for the oxygen and the latter for the acetylene. The pipes are secured to the head in a suitable manner, as for instance, by screw threads, coupling collars, brazing or the like, and the tip has a mixing chamber 30 to which the separate gases are delivered and an outlet passage 31 through which the co-mingled gases escape. The outlet from the passage 31 is shown as of the same diameter as the mixing chamber although between these two points the passage is shown of slightly larger diameter. The head has a passage 32 in axial alinement with the mixing chamber and delivery passage and communicating with the oxygen pipe 28. The head also has an annular passage 33 communicating with the acetylene pipe 29 and with an annular groove or chamber 34, in the end of the tip. From this annular groove one or more passages 35 lead downwardly and inwardly and deliver to the oxygen passage in the mixing chamber 30.

This arrangement of passages and constructural features of the head and tip may be widely varied without departing from the spirit of my invention as my invention involves primarily the relative sizes of the passages and the relative pressures of the gases. In the specific form shown in Figs. 2, 3, and 4 there are 4 acetylene passages leading to the mixing chamber and the oxygen delivery passage is of the same diameter and in fact a mere continuation of the mixing chamber. As one important feature of my invention I at all times so adjust the pressure regulators and the controlling valves that the acetylene flowing through the passages 35 is at a slightly higher pressure than the pressure of the oxygen flowing through the portion of the oxygen delivery passage 36 directly above the mixing chamber 30. As another important feature of my invention I make the sum total of the areas of the several passages 35 approximately equal to one half the area of the oxygen passage at the mixing chamber. This proportion is on the assumption that acetylene is the combustible gas to be used for it is evident that other proportions would be necessary for other combustible gases depending upon the relative volumes which are required to produce a neutral flame. I do not wish to be limited to any specific differences in pressure but I have found through experience that the pressure for the acetylene need be only very slightly greater than that of the oxygen at the mixing chamber (9¾ lbs. to 9 lbs. for instance) to give satisfactory results. In practice, I find that for most constructions, it is necessary to make the sum total of the acetylene passages slightly less than one half the cross sectional area of the oxygen passage at the mixing chamber. This is due in part to the fact that the acetylene is of lighter specific gravity and also due to the fact that the acetylene is under a slightly higher pressure. I find from experience that if the number of passages 35 be increased in number and correspondingly decreased in size, a slightly greater sum total of cross sectional areas of the acetylene passages is required due to the increased resistance or surface friction of the gas in passing through the smaller passages. Due to this frictional resistance the smaller the acetylene passages and the greater their number, the larger will have to be their total cross sectional area. It is also probable that a difference in the angle at which the acetylene passages intersect the mixing chamber may to a slight extent also necessitate corresponding changes in the size of said passages.

As an example of a satisfactory type which burns equal quantities of oxygen and acetylene, produces a neutral flame, and will not flash back under the most trying conditions, is one constructed as shown in Figs. 2 to 4 inclusive in which the exit of the tip, the mixing chamber and the oxygen inlet, have an area of .00907 square inches and each of 6 acetylene passages have an area of .000754 sq. in. Therefore the sum total of the cross sectional areas of the acetylene passages is .00452 sq. in. which is approximately one half the area of the oxygen entrance and the mixing chamber. I have operated such a tip to produce highly satisfactory results with an acetylene pressure of 5 lbs. and an oxygen pressure of 4 lbs. It is absolutely essential that the pressures be such in respect to the size of the passages that the gases at the mixing chamber and at the outlet from the tip will travel at velocities greater than the rate of flame propagation in a mixture which will produce a neutral flame.

Another satisfactory tip which I have constructed in accordance with my invention has an oxygen inlet and mixing chamber with a cross sectional area .00580 sq. in. and 6 acetylene passages each of a cross sectional area of .00049 sq. in. or a total area of .00294 sq. in. which is approximately half the area of the mixing chamber. This tip may have an area as large as .00907 sq. in. at the outlet, and produce a neutral flame at the outlet with the acetylene pressure at 10 lbs. and the oxygen pressure at 9 lbs.

Inasmuch as the acetylene pressure at the point of the co-mingling with the oxygen is greater than that of the oxygen it follows that the character of the mixture at this point is slightly carbonizing. It is possible to change slightly the areas of these conduits and mixing chambers without affecting the principle of my invention, but in no case, with the acetylene going through lateral ducts and the oxygen through a central duct must the mixing chamber and oxygen entrance be so restricted that a greater pressure of oxygen is required than that of acetylene to produce a neutral flame. I am not prepared to state exactly how much the acetylene passages may be reduced in area below one half that of the oxygen passage but unless the acetylene be under very high pressure a reduction of as much as 25% in the area of the acetylene passages will cause the torch to flash back as more oxygen pressure will be required than acetylene to produce a neutral flame.

If the area of the mixing chamber be enlarged as much as 25% in respect to the acetylene passages the torch seems to flash back due to the lack of velocity of the mixed gases at that point.

While I have shown 4 passages in Figs. 3 and 4, it will of course be evident that any number from 1 up may be employed. On welding tips of comparatively small flame size it is desirable to make the acetylene ports one or not more than two in number but on larger tips I have obtained very satisfactory results with as many as 8 acetylene passages entering the mixing chamber.

In Fig. 5 I have shown a cutting torch in which the tip 40 has a central oxygen passage 41 and an annular series of passages 42 for the mixed gases. The mixing chamber 43 in this case is located in the head rather than in the tip. The construction does not differ in principle from the one hereinbefore described and differs in construction only in accordance with common practice in the building of cutting torches. I secure the desired neutral flame, the economy of oxygen, and the prevention of the flash-back, by the proportioning of the passages and pressures as hereinbefore described.

In Figs. 6 and 7 I have shown a tip 45 for a cutting torch in which there is a central oxygen passage 46, an annular series of passages 47 for the co-mingled gases, and a series of mixing chambers 48, one at the upper end of each mixture passage. Here the several oxygen passages 49 are in alinement with and of the same size as the mixture passages and each mixing chamber has only a single acetylene duct leading thereto. This is slightly less than one half the cross sectional area of the oxygen passage. This tip is adapted for use in connection with a head so designed that independently controllable streams of oxygen will flow to the central passage 46 and the annular passages 49 and acetylene will flow to the several inclined ducts 50.

It is not essential that the passage through the tip be of uniform area as it may be slightly larger along most of its length than it is at the mixing chamber. The gases along the body of the passage may not be moving at a speed greater than the speed of flame propagation but for reasons previously explained the torch will not flash provided the gases within the mixing chamber are moving at a speed greater than the speed of flame propagation and the acetylene pressure is in excess. If the flame temporarily enters the passage the pressure wave traveling up the passage will hold back the oxygen of lesser pressure more than it will the acetylene of higher pressure and therefore the acetylene will instantly be in excess and produce a carbonizing flame in which the rate of flame propagation is slower and the flame will recede to its normal position just beyond the outlet from the tip. The diameter of the orifice or outlet of the tip may be somewhat larger than the mixing chamber but should not be considerably smaller than that of the mixing chamber even though the conduits in the mixing chamber be arranged as hereinbefore described. Otherwise the torch may flash under some conditions due to the fact that the outlet prevents the speed of the mixture in the mixing chamber from being in excess of the rate of flame propagation.

While I have referred particularly to the acetylene entering through lateral ports and the oxygen through a central duct, it is possible to obtain the same results by reversing this arrangement, that is, by having the acetylene pass through the central duct and the oxygen through the lateral ports, that is, provided the mixing chamber is so designed with reference to areas that the acetylene at the point of co-mingling of the gases is under a greater pressure than that of the oxygen with a neutral flame burning at the tip.

In the employment of my method it is entirely practical to reduce, by means of enlarged conduits or tapered chambers, the velocity of the gases as they leave the mixing chamber and before they reach the outlet point to a speed below that of the speed of flame propagation without having the torch flash back.

I have previously stated that the theoretical consumption of oxy-acetylene flame is one volume of oxygen to one volume of acetylene and in practice this theoretical consumption is not usually reached. In torches using the oxygen under a higher pressure than the acetylene there is a tendency, as I have previously described, of the flame becoming oxidized at various times. The higher pressure of the oxygen and the fact that it is the heavier gas has a tendency to cause an excess of oxygen to be used. On the other hand a torch such as I have described, wherein the acetylene is used under a greater pressure than the oxygen, cannot consume more than the theoretical mixture as the acetylene is always in excess and holds back the oxygen if at any time the operation of the torch causes a back pressure.

In Figs. 2, 3 and 4, I have illustrated the mixing chamber as being formed in a tube inserted in the body of the tip. This forms no portion of my present invention, the same being described in detail and claimed in my co-pending application Serial No. 271,814, filed January 18th, 1919.

Having thus described my invention what I claim as new and desire to secure by Letters Patent is:

1. The method of burning gases to produce a neutral flame in an oxy-acetylene blow pipe or torch having a mixing chamber and a delivery outlet, which method consists in delivering substantially equal quantities of acetylene and oxygen to said mixing chamber, the acetylene being delivered at a pressure slightly higher than that of the oxygen, and causing said gases at the point of co-mingling to travel at a higher velocity than that of the propagation of the flame produced by said gases.

2. The method of preventing flash-backs in a blow pipe or torch having a mixing chamber and a delivery outlet, which method consists in delivering the acetylene to the stream of oxygen at a pressure slightly higher than that of the oxygen and causing said gases at the point of co-mingling to travel at a higher velocity than the rate of flame propagation produced by said gases.

3. The method of burning oxygen and acetylene gases to produce a neutral flame and preventing flash-backs in a welding or cutting torch, having the oxygen inlet to the mixing chamber of approximately the same size as the mixing chamber, and the acetylene inlet to the mixing chamber of a total cross sectional area slightly less than one half that of the mixing chamber, which method consists in causing the acetylene to enter the mixing chamber at a slightly higher pressure that that of the oxygen.

4. The method of producing a neutral flame of mixed combustible and combustion supporting gases and preventing burning in the mixing chamber which method consists in delivering both gases at the point of co-mingling at a higher velocity than the rate of flame propagation in a mixture which will produce a neutral flame, the combustible gas being delivered to the mixing chamber at a slightly higher pressure than the combustion supporting gas and through a passage or passages so proportioned in total cross sectional area, in respect to its or their angle of delivery, surface friction, etc., and the cross sectional area of the passage for the combustion supporting gas, and in respect to the relative specific gravities, and chemical compositions of the gases, that a neutral flame will normally be produced and obstruction of the tip will result in an excess of combustible gas in the mixing chamber and a reduced rate of flame propagation at the point of mixing.

5. The method of producing a neutral flame of mixed acetylene and oxygen gases and preventing burning in the mixing chamber which method consists in delivering both gases at the point of co-mingling at a higher velocity than the rate of flame propagation in a mixture which will produce a neutral flame, the oxygen gas being delivered to the mixing chamber through a passage of substantially the same size as the mixing chamber and the acetylene being delivered to the mixing chamber at a slightly higher pressure than the oxygen and through a passage or passages approximately one half the cross sectional area of the mixing chamber, the variation from the theoretical one half being dependent upon the relative pressures and specific gravities of the gases and the relative surface frictions of their passages, whereby a neutral flame will normally be produced and obstruction or increased resistance in or at the tip will result in an excess of acetylene in the mixing chamber and a reduced rate of flame propagation between the outlet and the point of mixing.

6. An oxy-acetylene blow pipe or torch having a mixing chamber, and means for introducing oxygen and acetylene to said chamber, the oxygen inlet to the mixing chamber being of substantially the same cross sectional area as said mixing chamber, and the acetylene inlet or inlets being of a total cross section area approximately one-half the cross sectional area of said mixing chamber, and means for delivering the acetylene to its inlet at a slightly higher pressure than the oxygen to its inlet, the velocity of delivery of each of said gases in the mixing chamber at the point of co-mingling being higher than that of the propagation of the flame produced by said gases.

7. A blow pipe or torch having a mixing chamber, and means for introducing combustion supporting and combustible gases to said chamber, the inlet for one gas to the mixing chamber being of substantially the same cross sectional area as said mixing chamber, and the inlet for the other being materially smaller in cross sectional area than said mixing chamber, and means for delivering the combustible gas to its inlet at a slightly higher pressure than the combustion supporting gas to its inlet, the velocity of delivery of each of said gases in the mixing chamber at the point of co-mingling being higher than that of the propagation of the flame produced by said gases.

8. An oxy-acteylene blow pipe or torch having a mixing chamber, an oxygen inlet to the mixing chamber of substantially the same cross sectional area as said mixing chamber, and an acetylene inlet of approximately one half the cross sectional area of said mixing chamber, and means for delivering the acetylene to its inlet at a slightly higher pressure than the oxygen to its inlet.

9. A tip for oxy-acetylene burners having a passage therethrough, a section of the passage at one end being of uniform diameter and of not materially less diameter than the outlet at the opposite end of the passage, and one or more acetylene inlet passages intersecting said section intermediate of the ends of the latter, the portion of said section above the transverse plane of intersection constituting an oxygen inlet passage, and the portion below said plane constituting a mixing chamber, the total cross-sectional area of said acetylene inlet passage or passages being slightly less than one-half the cross-sectional area of said mixing chamber.

10. A tip for oxy-actylene burners having a passage therethrough, a section of the passage at one end being of uniform diameter and of not materially less diameter than the outlet at the opposite end of the passage, and one or more acetylene inlet passages intersecting said section intermediate of the ends of the latter, the portion of said section above the transverse plane of intersection constituting an oxygen inlet passage, and the portion below said plane constituting a mixing chamber, the total cross-sectional area of said acetylene inlet passage or passages being equal to a little less than one-half the cross-sectional area of said mixing chamber, and means for delivering acetylene through its passage or passages at a higher pressure than the oxygen through its passage.

11. A cutting or welding torch, mixing chamber, having an oxygen inlet of the same size as the mixing chamber, and an acetylene inlet of slightly less than one half the cross sectional area of the mixing chamber.

12. A tip having a mixing chamber provided with an oxygen inlet and an acetylene inlet, the latter being of approximately one half the cross sectional area of the former, and means for delivering acetylene to its inlet under a pressure higher than that of the oxygen to its inlet.

13. A tip for oxy-acetylene burners, having a passage therethrough, open at one end to serve as an oxygen inlet, and one or more passages intersecting said first mentioned passage and of a total cross sectional area slightly less than one half that of said first mentioned passage and serving for the admission of acetylene thereto.

14. An oxy-acetylene welding tip, having a mixing chamber, means for delivering oxygen lengthwise thereof, an acetylene passage entering said chamber at an acute angle, and means for delivering acetylene through said passage at a velocity higher than the rate of flame propagation in the resulting mixture in said chamber and under a pressure higher than that at which the oxygen is delivered.

Signed at New York city, in the county of New York and State of New York, this 5th day of April, A. D. 1918.

MELBOURNE KEITH DUNHAM.